Figure 1:
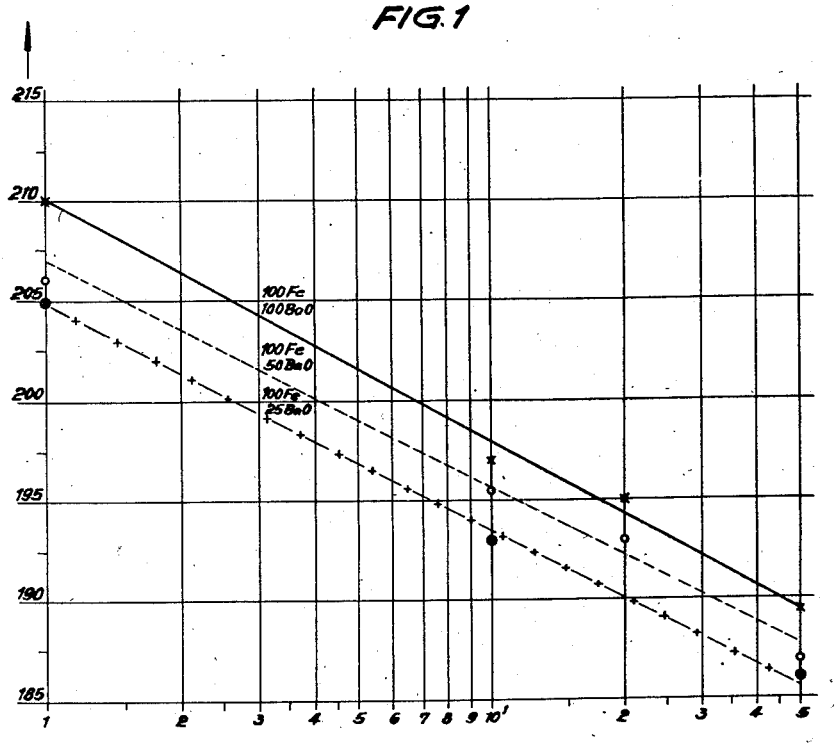

March 19, 1957 W. ROTTIG 2,786,070
PROCESS FOR THE HYDROGENATION OF CARBON MONOXIDE
Filed Nov. 10, 1953 4 Sheets-Sheet 1

INVENTOR
WALTER ROTTIG
BY
ATTORNEYS

March 19, 1957   W. ROTTIG   2,786,070
PROCESS FOR THE HYDROGENATION OF CARBON MONOXIDE
Filed Nov. 10, 1953   4 Sheets-Sheet 3

INVENTOR
WALTER ROTTIG
BY Burgess and Dinklage
ATTORNEYS

2,786,070

PROCESS FOR THE HYDROGENATION OF CARBON MONOXIDE

Walter Rottig, Oberhausen-Sterkrade-Nord, Germany, assignor to Ruhrchemie Aktiengesellschaft, Oberhausen-Holten, Germany, and Lurgi Gesellschaft fuer Waermetechnik m. b. H., Frankfurt am Main, Germany Application November 10, 1953, Serial No. 391,308

Claims priority, application Germany November 13, 1952

11 Claims. (Cl. 260—449.6)

This invention relates to an improvement in the hydrogenation of carbon monoxide. More particularly, the present invention pertains to the use of novel catalysts in the hydrogenation of carbon monoxide.

It is well known that the activity of precipitated catalysts containing iron, cobalt and nickel can be enhanced by adding so-called "activators" or "promoters." Although it is in some cases difficult to differentiate between promoters and supporters, a number of chemical elements and compounds very definitely act as promoters. A typical example of a promoter is alkali, which is present in a great many iron catalysts, for example, in the form of alkali carbonate, -silicate, -phosphate, or -fluoride. Other promoters include copper, silver, alumina, cerium, vanadium, chromium, manganese, and zinc.

Substances which are very frequently used as supporting materials for catalysts, but which, in addition thereto, have an activating effect on the catalyst, are compounds of alkali earth metals, such as calcium carbonate, magnesium carbonate, dolomite, etc. It is typical of the function of these materials as supporters that they are used in relatively large quantities. Thus, iron catalysts comprising about 10% of calcium have been described. Catalysts containing iron and copper in a proportion of 10:(20–40) are also known.

It is an object of the present invention to provide novel catalysts for the hydrogenation of carbon monoxide. Another object is to provide catalysts which exhibit a particularly high activity with respect to the carbon monoxide hydrogenation. A further object is to provide catalysts having good mechanical properties. A still further object is to provide reaction conditions under which great over-all yields and a high proportion of oxygenated compounds are obtained in the hydrogenation of carbon monoxide. Still further objects will appear hereinafter.

It has very surprisingly been found that barium enhances the activity of precipitated iron-copper-alkali catalysts to a much greater extent than magnesium, calcium, and strontium.

In particular, catalysts containing 10–50, and preferably 10–30 parts of barium oxide, more than 25, and preferably 25–200 parts of copper, more than 2, and preferably more than 5 parts of alkali (calculated as $K_2O$), and 0–10 parts of a supporting material per 100 parts of iron, more than 50, and preferably more than 75% of the latter being present in the metallic form, have been found to be very valuable for the hydrogenation of carbon monoxide. When synthesis gases containing CO and $H_2$ in a molar ratio of $CO:H_2$ within the range of 1:0.5 to 1:10 at temperatures between 150 and 300° C. and at pressures above 10, and preferably between 30 and 50 atmospheres excess (i. e., in excess of atmospheric pressure) are passed over catalysts of the above composition, a reaction product containing more than 50% of oxygenated compounds is obtained in a good over-all yield.

The catalysts in accordance with the invention are not only distinguished by an extraordinary catalytic activity, but offer the additional advantage of having high mechanical strength and chemical resistance. This property is very desirable in a carbon monoxide hydrogenation process which leads to the formation of an enhanced proportion of oxygen-containing compounds including alcohols, esters, ketones, aldehydes, and free acids, since the latter have the tendency to attack the catalyst grains. Thus, less resistant catalysts are easily disintegrated to a pulverulent mass, which causes pressure losses and even obstructions in the reactor.

Although the combination of iron with barium partially accounts for the good qualities of the new catalysts, particularly with respect to their mechanical strength, optimum results as to the over-all yield and the increased formation of oxygenated compounds are attained only with the catalysts in accordance with the invention, i. e., with the combination of iron, barium, copper, and alkali in the above-stated proportions.

In preparing the new catalysts, the alkali is generally incorporated in the form of the hydroxide, carbonate, bicarbonate, or a decomposable organic compound, such as formates or oxalates. Phosphates may also be used, whereas silicates and borates have been found to be detrimental.

A method of producing the catalyst in accordance with the invention comprises precipitating iron, copper, and barium with an alkali carbonate solution at boiling temperature. In order to produce catalysts of optimum activity, the pH of the suspension resulting from the precipitation is to be adjusted to a value above 7 and preferably above 8.2. However, a pH value substantially in excess of 10 will adversely effect the activity of the finished catalyst. For attaining an optimum activity, it is important to precipitate barium along with the other metals, in other words, to start from a mixed barium-iron-copper solution. Conventional methods in which the alkali earth metals are added with stirring after the precipitation of the other metals (in the same manner as supporting materials, such as kieselguhr, are commonly introduced) give catalysts of lower activity.

After the precipitation, the catalyst mass is filtered from the hot solution. It is then possible to adjust the desired alkali content of the catalyst by partially washing the same. Alternatively, the catalyst may be washed thoroughly and then impregnated with the desired alkali compound. In both cases it is advisable to use condensate rather than tap water for washing. Thereupon, the catalyst mass is molded, for example, in an extrusion press. Prior to molding, it may be advantageous to dry the catalyst mass for a short time in order to reduce its water content. The most favorable water content for molding in an extrusion press ranges from about 50–75%. The molded grains are subjected to a final drying at a temperature of about 100° C., crushed, and sieved. However, the catalyst mass may also be applied in thin layers on metal plates for drying at a temperature of about 100° C. to a water content of about 5–10%. The mass is then crushed and sieved as above. The grain size of the catalyst is determined within certain limits by the layer height to be used in the synthesis. If the layer height of the catalyst in the reaction vessel is low, small pellets having a diameter of about 0.5 mm. may be used with good success. In the case of high layers (5–10 m.), larger pellets having a diameter of between 1.5 and 3 mm. are preferable. Small-sized catalyst pellets have the advantage of exhibiting a particularly high activity.

The reduction of the catalysts in accordance with the invention may be effected at normal and reduced pressure, but very frequently it is advantageous to employ elevated pressure, as, for example, the same pressure which is used in the later synthesis. When operating at normal pressure, high gas-flow velocities, ranging from about 50–200 cm. per second (calculated at standard conditions), may be used. For the reduction under pressure, an effective gas-flow velocity within the range of from about 5–30 cm. per second is recommended. The reduction can be effected with hydrogen and/or carbon monoxide-containing gases. The temperature at which the reduction is conducted generally ranges from about 150–350° C. and is preferably within the range of between 250 and 300° C. The water content of the gases used for the reduction should be as low as possible, for example, of the order of below 1 gram, and preferably less than 0.1 gram per cubic meter of reducing gas. The catalyst to be reduced should also have as low as possible a water content, for example, of the order of below 2 and preferably of below 0.5%. Such a low water content is obtained by drying at temperatures within the range of from 100 and 200° C. in an air current.

The reduction of the catalysts is carried out to such an extent as to convert 50, and preferably more than 75% of the iron content to the metallic form, i. e., to a reduction value of at least 50, and preferably more than 75%, as catalysts of this kind give the highest yields of oxygenated compounds, while, at the same time, permitting operation at low temperatures.

The catalysts in accordance with the invention may be used for syntheses conducted at normal pressure. However, in this case, only low yields of oxygenated compounds can generally be expected. The process becomes more favorable from the technological and commercial point of view if pressures in excess of 10, and preferably of between 30 and 50 atmospheres are used. Under these conditions high yields of oxygenated compounds are obtained, the catalyst retains its activity very long, and a relatively low formation of methane and ethane occurs.

Gases of various composition containing carbon monoxide and hydrogen in the ratio of $CO:H_2$ within the range of 1:0.5 to 1:10 may be used for the synthesis. In general, a ratio of between 1:1 and 1:2 will be preferable. An increase in the carbon monoxide content of the synthesis gas has been found to result in higher yields of high-molecular oxygenated compounds, predominantly in the form of esters, while by an increase of the hydrogen content an increased yield of alcohols is obtained.

Recycling of the gas in the method of the invention is advantageously carried out with a recycle ratio of 1:1 to 1:3 part fresh gas to recycle gas. However, it is also possible to use the catalysts in accordance with the invention with straight gas passage. Even in a single stage operation, high conversions and good yields may be obtained with the new catalysts. However, a two-stage or multi-stage mode of operation, including, if necessary or desired, a carbon dioxide scrubbing unit between the individual stages will frequently be advantageous.

The catalysts in accordance with the invention will produce especially good results, if an increased gas load of, for example, 200–500 parts by volume of gas per part by volume of catalyst per hour is chosen. In this case, a considerable increase, compared with the normal gas load (about 1:100) in the yield of alcohols within the boiling range of between about 200 and 300° C. is observed.

EXAMPLE

A catalyst was precipitated by adding a boiling solution containing per liter 40 g. of iron, 8 g. of copper and 40 g. of BaO in the form of the nitrates to a boiling soda solution containing about 105 g. $Na_2CO_3$ per liter of solution. The catalyst was subsequently very carefully washed with hot condensate and thereafter impregnated with potassium carbonate in such a manner that 8 parts of alkali, calculated as $K_2O$, were present per 100 parts of iron. The catalyst mass was brushed on metal plates, dried for 24 hours at a temperature of about 110° C., and subsequently crushed to a grain size of 2–4 mm. In the same manner there were produced catalysts containing instead of BaO the same quantities by weight of CaO and SrO. These catalysts were reduced for 4 hours at a temperature of 320° C. at normal pressure with a gas mixture consisting of 75% $H_2$ and 25% $N_2$ using a linear gas velocity of 1.5 m. per second. The reduction value of all catalysts reduced in this manner ranged between 90 and 95%. The following table shows the synthesis results obtained with these catalysts under the following conditions:

Synthesis pressure_____ 30 atmospheres.
Synthesis gas_____ Water gas.
Gas load of the catalyst_____ 100 parts by volume of gas per part by volume of catalyst per hour.

The synthesis reactors used were the so-called double-tube furnaces.

Table 1

| Catalyst composition | 100 Fe 20 Cu 100 BaO | 100 Fe 20 Cu 100 CaO | 100 Fe 20 Cu 100 SrO |
|---|---|---|---|
| Synthesis temperature ° C. | 195 | 210 | 224 |
| CO+H₂ conversion percent | 61 | 55 | 45 |
| Products boiling above 320° C. based on total liquid product percent | 18 | 13 | 11 |
| Olefins 30–180° C. do | 17 | 18 | 22 |
| Oxygenated compounds 80–180° C.¹ percent | 62 | 56 | 56 |
| Olefins 180–320° C. do | 18 | 19 | 30 |
| Oxygenated compounds: | | | |
| 180–320° C. do | 67 | 56 | 36 |
| above 320° C. do | 54 | 44 | 37 |
| above 460° C. do | 38 | 32 | 40 |

¹ See footnote, table 2.

In another series of experiments in which only 50 instead of 100 parts of alkaline earth based on 100 parts of iron were used, similar results were obtained.

The catalysts employed in Table 2 below were prepared in the same manner as for Table 1 with the exception of the copper content as shown, the synthesis pressure, gas, and gas load being the same as in Table 1.

Table 2

| Catalyst composition | 100 Fe 1 Cu 100 BaO | 100 Fe 1 Cu 100 CaO | 100 Fe 1 Cu 100 SrO |
|---|---|---|---|
| Synthesis temperature ° C. | 210 | 232 | 240 |
| CO+H₂ conversion percent | 55 | 48 | 41 |
| Products boiling above 320° C. based on total liquid product percent | 16 | 8 | 7 |
| Olefins 30–180° C. do | 13 | 27 | 22 |
| Oxygenated compounds 80–180° C.¹ percent | 63 | 51 | 58 |
| Olefins 180–320° C. do | 12 | 25 | 22 |
| Oxygenated compounds: | | | |
| 180–320° C. do | 55 | 40 | 48 |
| 320–460° C. do | 48 | 32 | 40 |
| above 460° C. do | 32 | 16 | |

¹ The oxygenated compounds below 80° C. are mainly contained in the aqueous phase.

In another series of experiments in which continuous operation was used, the same results were obtained in principle.

In the drawings 1–4 attached hereto, the effect of the barium and copper content on the activity of the catalyst is shown.

In Fig. 1, which relates to experiments conducted with the normal gas load of 1:100, the Cu contents in parts by weight per 100 parts of iron is represented on the horizontal and the reaction temperatures in Celsius degrees are represented on the vertical line. Fig. 1 shows that an increasing copper content at the normal gas load entails a considerable improvement of the activity, so that a lowering of the reaction temperature is made possible. A decrease of the barium oxide content from 100 to 25 parts based on 100 parts of iron also permits a certain reduction of the reaction temperature. In these and the following experiments, a CO+H₂ conversion of about 61–63% was always maintained. The synthesis pressure was 30 atmospheres and water gas was used as the synthesis gas.

Figure 2:
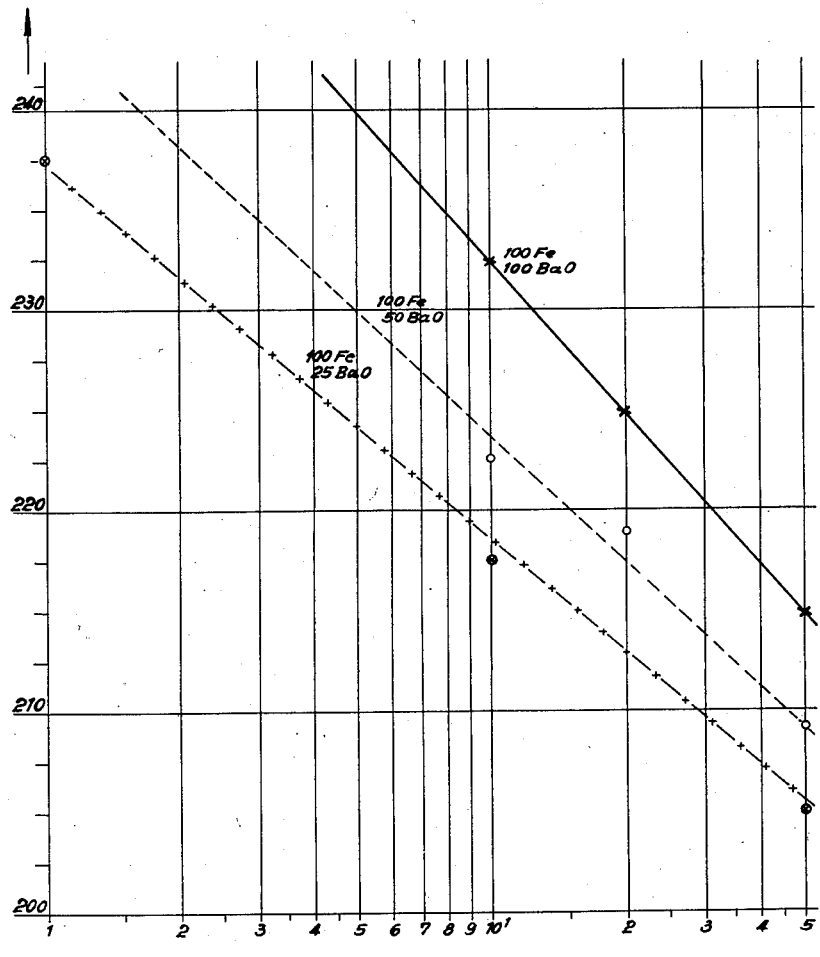

In Fig. 2 the horizontal and vertical lines have the same meaning as mentioned above, but all of the experiments were carried out with double the gas load. Within the given temperature range at least 5 parts of copper are required with a ratio of 100Fe:100BaO to assure satisfactory operation. It should be noted here that at temperatures in excess of about 250–260° C. all of the catalysts, particularly when operation lasts several months, are prone to a more or less high extent to a disintegration of the grains which frequently results in obstructions of the reactors. With a ratio of 100Fe:50BaO, too, at least about 2 parts of copper per 100 parts of iron must be present. Satisfactory operation was only obtained in the 100Fe:25BaO series of experiments.

Figure 3:
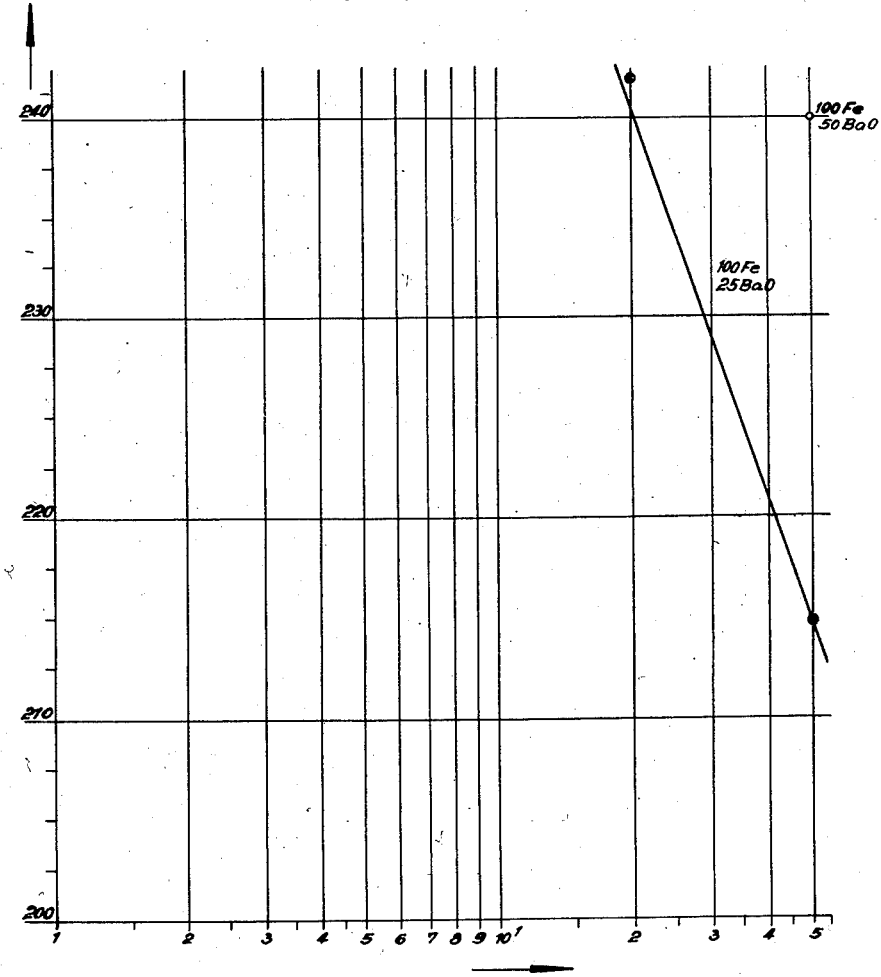

Fig. 3, the coordinate system of which has the same meaning as above, reveals that when using a three-fold gas load, all of the catalysts of the 100Fe:100BaO series of experiments and, therefore, the copper-rich catalysts, too, failed to produce good results within the given temperature range. They needed temperatures in excess of 250° C. for a CO+H₂ conversion of about 62%, and underwent at these high temperatures a partial disintegration which entailed a more or less high pressure loss after a relatively short time. Among the 100Fe:50BaO series, the only catalyst which showed satisfactory performance was that with 50Cu. From the 100Fe:25BaO series all of the catalysts containing less than 20 parts of copper per 100 parts of iron were unsatisfactory.

Figure 4:
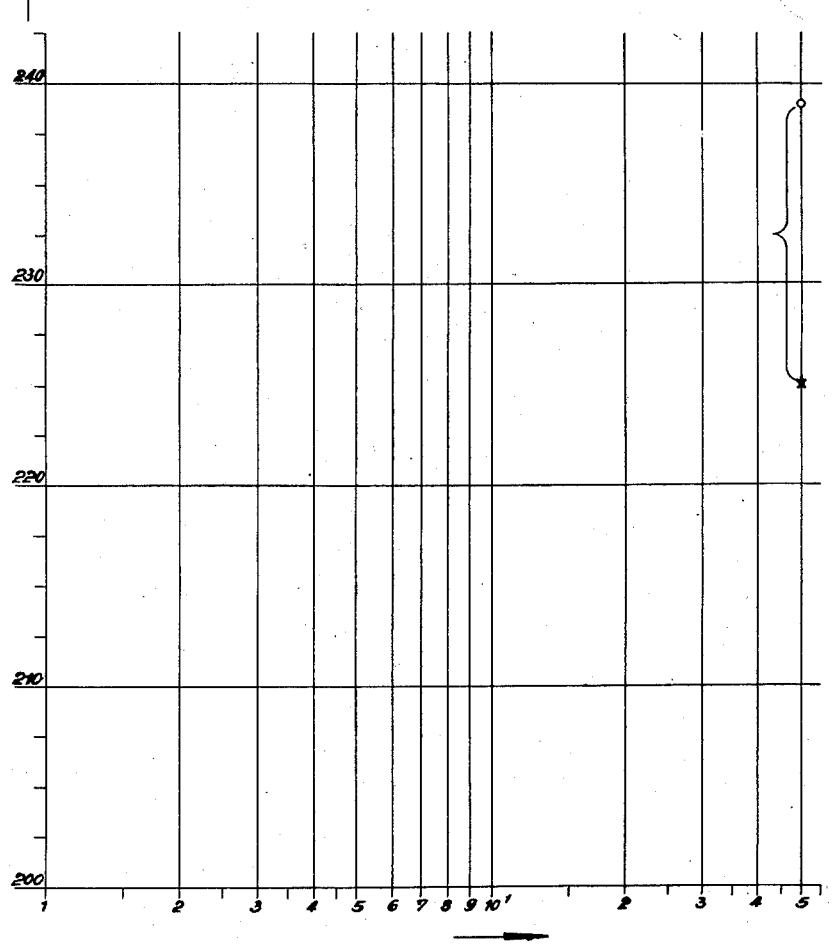

Fig. 4 shows that when using the 100Fe:25BaO:50Cu type catalyst even a four-fold to five-fold gas load could be reached with the given temperature range. In this drawing the coordinate system has the same meaning as that of Figs. 1–3. The point marked by a cross refers to a four-fold gas load, while that marked by a circle refers to a five-fold gas load.

Comparative tests were carried out with catalysts in which the same ratio of iron:copper was used, but which contained no supporting material. These catalysts, while giving good results with normal and slightly increased gas loads, likewise underwent a gradual disintegration with a three-fold to five-fold gas load.

The following table shows that in addition to an increased activity, still further advantages are offered by the catalysts in accordance with the invention, the catalyst being the same as described with respect to Table 1.

*Table 3*

METHANE FORMATION

|  | 100 Fe 10 Cu | 100 Fe 20 Cu | 100 Fe 50 Cu |
| --- | --- | --- | --- |
|  | Percent | Percent | Percent |
| Methane formation with: |  |  |  |
| 100 BaO | 14.0 | 11 | 7.5 |
| 50 BaO | 11.8 |  | 7.0 |
| 25 BaO | 10.5 |  | 5.5 |

(All experiments carried out at 30 atmospheres with normal water gas load.)

As may be seen from Table 1 in comparison with Table 2, the yield of oxygenated compounds rises very markedly with a rising copper content of the catalyst. A still further increase in the portion of oxygenated compounds was obtained if catalysts containing 50 parts Cu per 100 parts Fe were used.

Moreover, physical measurements revealed that an inner surface area of the reduced catalyst of approximately 10–110 sq. m. for each gram of present iron is of advantage. The optimum range seems to be within about 30 and 80 sq. m.

I claim:

1. In the catalytic hydrogenation of carbon monoxide, the improvement which comprises passing a synthesis gas containing carbon monoxide and hydrogen in a molar ratio of about 1:0.5 to 1:10 at temperatures of 150–300° C. and a pressure in excess of 10 atmospheres in contact with a catalyst essentially consisting of precipitated iron containing more than 50% of the iron in metallic form; 10–50 parts by weight of barium oxide per 100 parts by weight of iron; 25–200 parts by weight of copper per 100 parts by weight of iron; at least 2 parts by weight of alkali, calculated as K₂O per 100 parts by weight of iron; and 0–10 parts by weight of a supporting material per 100 parts by weight of iron, and recovering the synthesis product formed.

2. Process in accordance with claim 1, in which said precipitated iron catalyst contains per 100 parts by weight of iron 10–30 parts by weight of barium oxide.

3. Process in accordance with claim 1, in which said precipitated iron catalyst contains per 100 parts by weight of iron; more than 5 parts by weight of alkali calculated as K₂O.

4. Process in accordance with claim 1, in which said precipitated iron catalyst contains more than 75% of its iron in metallic form.

5. Process in accordance with claim 1, in which said contacting is effected with a synthesis gas having a carbon monoxide-hydrogen ratio of greater than 1, whereby an increased yield of high molecular oxygenated compounds, preferably in the form of esters, is obtained in said recovered synthesis product.

6. Process in accordance with claim 1, in which said synthesis gas has a carbon monoxide-hydrogen ratio of below 1, whereby an increased yield of alcohols is obtained in said recovered synthesis product.

7. Process in accordance with claim 1, in which said contacting is effected with a synthesis gas load ranging from about 200–500 parts per volume of gas per part by volume of catalyst per hour to thereby obtain an increased yield of alcohols boiling between about 200 and 300° C.

8. A carbon monoxide hydrogenation catalyst essentially consisting of precipitated iron containing more than 50% of the iron in metallic form; 10–50 parts by weight of barium oxide per 100 parts by weight of iron; 25–200 parts by weight of copper per 100 parts by weight of iron; at least 2 parts by weight of alkali, calculated as K₂O per 100 parts by weight of iron; and 0–10 parts by weight of a supporting material per 100 parts by weight of iron.

9. Catalyst in accordance with claim 8, in which said barium oxide is present in 10–30 parts by weight per 100 parts by weight of iron.

10. Catalyst in accordance with claim 8, in which said alkali is present in more than 5 parts by weight, calculated as K₂O per 100 parts of iron.

11. Catalyst in accordance with claim 8, which contains more than 75% of its iron in the metallic form.

References Cited in the file of this patent

UNITED STATES PATENTS

| 2,257,457 | Fischer et al. | Sept. 30, 1941 |
| 2,605,275 | Kearby et al. | July 29, 1952 |

FOREIGN PATENTS

| 672,259 | Great Britain | May 21, 1952 |

OTHER REFERENCES

Jour. Chem. Ind., Japan (Ogawa et al.), 47, pages 242–3 (1944). Abstracted in Chem. Abst., vol. 42, 1948, page 7011ᵉ.